United States Patent [19]

Nishino et al.

[11] Patent Number: 4,737,889
[45] Date of Patent: Apr. 12, 1988

[54] POLARIZABLE ELECTRODE BODY AND METHOD FOR ITS MAKING

[75] Inventors: Atsushi Nishino, Neyagawa; Ichiro Tanahashi, Kadoma; Akihiko Yoshida, Hirakata, all of Japan

[73] Assignee: Matsushita Electric Industrial Co., Ltd., Kadoma, Japan

[21] Appl. No.: 848,376

[22] PCT Filed: Apr. 10, 1985

[86] PCT No.: PCT/JP85/00182

§ 371 Date: Apr. 17, 1986

§ 102(e) Date: Apr. 17, 1986

[87] PCT Pub. No.: WO86/00750

PCT Pub. Date: Jan. 30, 1986

[30] Foreign Application Priority Data

Jul. 17, 1984 [JP] Japan ................... 59-147811
Jul. 27, 1984 [JP] Japan ................... 59-155149
Jul. 30, 1984 [JP] Japan ................... 59-157271
Sep. 6, 1984 [JP] Japan ................... 59-186715

[51] Int. Cl.⁴ .............................................. H01G 9/00
[52] U.S. Cl. ....................................... 361/433; 162/138
[58] Field of Search .................. 361/324, 433, 433 M; 29/25.42, 570; 204/264, 265; 131/331, 332, 342, 343, 345

[56] References Cited

U.S. PATENT DOCUMENTS 1,891,080 12/1932 Danziger ...................... 361/324 X
2,535,690 12/1950 Miller et al. .................. 361/324 X
3,313,665  4/1967 Berger ......................... 131/343 X
3,426,764  2/1969 Pearman ......................... 131/345
3,536,963 10/1970 Boos .............................. 361/433 A
4,195,649  4/1980 Noguchi et al. .................. 131/342
4,327,400  4/1982 Muranaka et al. ................. 361/433
4,352,768 10/1982 Epstein .......................... 264/105
4,562,511 12/1985 Nishino et al. ................... 361/324
4,579,130  4/1986 Coffman .......................... 131/332
4,597,028  6/1986 Yoshida et al. ................ 29/25.42 X

FOREIGN PATENT DOCUMENTS 2190728 2/1974 France .
A593868 1/1984 Japan .
555964 9/1962 United Kingdom .......... 361/433 W
1033816 6/1966 United Kingdom ................ 361/324

Primary Examiner—Donald A. Griffin
Attorney, Agent, or Firm—Cushman, Darby & Cushman

[57] ABSTRACT

A polarizable electrode body which has as a constituting member a paper-type body having activated carbon fiber and a fibrous binding medium as its composition, and also a electric double-layer capacitor having the polarizable electrode body as its constituting member. In comparison with a conventional simple polarizable electrode body of activated carbon fiber fabric, higher integration can be made and charged electric charge per unit volume can be increased, and the electric charge to be stored in the polarizable electrode body can be easily adjusted.

39 Claims, 7 Drawing Sheets

POLARIZABLE ELECTRODE BODY AND METHOD FOR ITS MAKING

BACKGROUND OF THE INVENTION

1. TECHNICAL FIELD

The present invention relates to a sheet type polarizable electrode body constituted by activated carbon fiber and binder and to method for making the polarizable electrode body, and further to an electric double layer capacitor using the polarizable electrode.

2. BACKGROUND ART

As a polarizable electrode material utilizing activated carbon, an instance wherein conductive agents such as graphite, carbon black or the like and a binder such as polytetrafluoroethylene are added to activated carbon powder to make a paste, which is then pressed onto a collector material such as punched metal foil, is well known. Besides, another instance wherein a conductive layer made by spraying of metal is provided on one side of an activated carbon fiber fabric has been proposed.

In that which uses the activated carbon powder as the polarizable electrode material, the bonding force between the metal collector and the polarizable electrode is weak and the activated carbon powder drops off from the collector or peels off therefrom or the bonding force between both members becomes weak during use due to stress caused by winding, and as a result, the internal resistance of the electric double layer capacitor gradually increases, thereby to deteriorate the collecting characteristic. Furthermore, when the polarizable electrode body consisting of the activated carbon powder and the binder is press-rolled onto the collector, its application efficiency is poor and there is a problem of divergence of capacity due to non-uniform application of the polarizabale electrode body. Moreover, when the activated carbon powder is used, forming of the electrode in a flat plate coin type structure is difficult. More concretely, during manufacturing of the polarizable electrode body, a press-forming can not be made unless the activated carbon powder has been preliminarily mixed up with electrolyte to form a paste. Therefore, in the case of an organic electrolyte wherein a very small water content will give adverse influence to the capacity characteristic is used, the polarizable electrode body must be sufficiently dried to remove the contained water.

Figure 1:
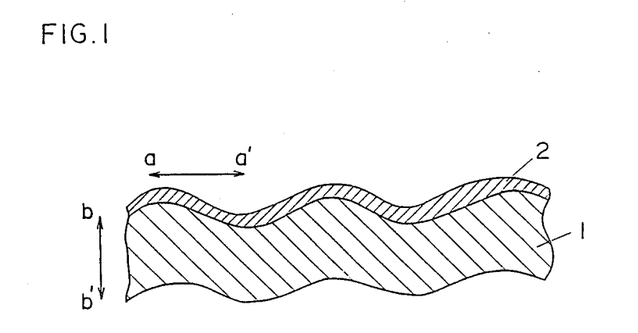
FIG. 1 is a sectional view of the polarizable electrode body in accordance with the prior art.

Next, one wherein the activated carbon fiber fabric is used as the polarizable electrode can be easily made to a small type large capacity coin type capacitor. However, in the polarizable electrode body wherein a metal electrode layer 2 such as aluminum is formed on the activated carbon fiber texture 1 as shown in FIG. 1, conductivity in an a—a' direction in the drawing near the electrode layer is very good, but conductivity in the b—b' direction is poor. Accordingly, it is necessary that pressing with large force is made at during the sealing of the casing, so as to obtain sufficient physical contact among the fibers in the b—b' direction, to maintain the internal resistance in low state.

Furthermore, even when the activated carbon fiber texture of phenol type is used, when an specific surface area becomes above 2300 $m^2/g$ (BET method), the strength is very much lowered and forming of the collector or the like with retaining the configuration becomes very difficult.

SUMMARY OF THE INVENTION

The present invention relates to a polarizable electrode material made of activated carbon fiber fabric and a binder by a paper making method, and to an electric double layer capacitor constituted substantially of conductive electrode (conductive layer) on at least one surface of the polarizable electrode body, opposing electrode(s) disposed with separator in between and an electrolyte, and has a characteristic of particularly having high density of the polarizable electrode body and a small internal resistance, hence easy manufacturing.

DETAILED DESCRIPTION OF PREFERRED EMBODIMENTS OF THE INVENTION

A concrete contents of this invention is elucidated. Polarizable electrode of the present invention has the following characteristics in comparison with the conventional polarizable electrode of activated carbon fiber fabric:

(1) Though the activated carbon fiber fabric is self-supporting, its strength is very much lowered when its specific surface area is made above 2000 $m^2/g$; on the other hand, in case a polarizable electrode body of sheet type is made by a paper-making method using chopped type activated carbon fiber having a specific surface area of above 2000 $m^2/g$ and a binder, charged electricity per unit volume can be made great, since such a polarizable electrode body has high strength, and besides, the specific surface area of the activated carbon fiber per se is made large, and furthermore a sheet type one can be made in higher density.

(2) In the activated carbon fiber fabric, the electric conductivity in the lateral direction is good, but in the thickness direction the electric conductivity becomes smaller than that in the lateral direction, since continuous links of fiber are smaller; on the other hand, in the sheet type polarizable electrode body, by addition of a conductivity improving agent or the like, the electric conductivities both in the thickness direction and the lateral direction are improved, making the internal resistance small.

(3) In case of the activated carbon fiber fabric, making of a 100 μm thick or lower polarizable electrode body is very difficult; while in the sheet type polarizable electrode body, a 30 μm thick one can be made easily.

(4) Though in case of the activated carbon fiber texture many steps are required to adjust charges to be charged in the polarizable electrodes, in case of the sheet type polarized electrode material, one having a desired charged electricity is obtainable with easy steps.

Figure 2:
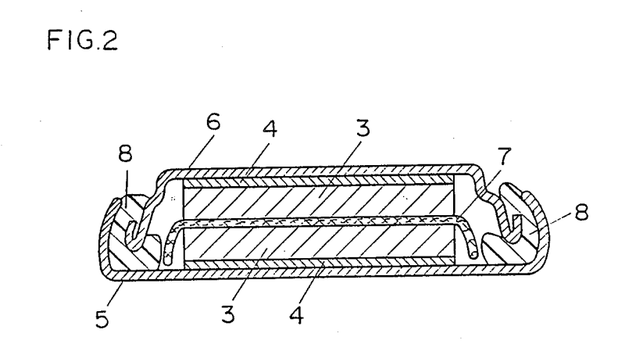
FIG. 2 is a sectional configuration view of a capacitor of one embodiment of the present invention.

Next, an example of a constitution of a representative electric double layer capacitor of present invention is shown in FIG. 2. In FIGS. 2, 3 is a sheet-shaped polarizable electrode body, having metal conductor layer 4 on one side surface thereof, and the polarizable electrode body having the above-mentioned conductor bodies are spot-welded respectively to a metal casing 5 and a metal seal plate 6, to obtain a stable electrode connection. Two sheets of polarizable electrode bodies are disposed opposingly with a separator 7 in between, and after filling electrolytic solution therein by using a gasket 8 to prevent short-circuiting between positive and negative electrodes, a caulking (i.e. squeeze-forming, e.g. crimping) for sealing is made to make a coin type electric double layer capacitor.

Furthermore, detailed explanation is made on characteristics and a method for making of the electric double layer capacitor of the present invention.

(1) Polarizable electrode body:

The polarizable electrode body fundamentally has activated carbon fiber as the host material, and binding media such as the pulp as fundamental body, and further, a conductivity improvement agent such as carbon fiber is added to the above-mentioned components. Generally, among activated carbon fibers, there are phenol type ones, rayon type ones, polyacrilonitrile (PAN) type ones and pitch type ones, depending on differences in the starting materials. Among these, especially the phenol type ones are most splendid in strength, carbonization activation yield and electric characteristic. In this invention, principally tow type phenolic resin fiber of 10–14 μm diameter is carbonized and activated by steam under 1000° C. atmosphere to produce tow type activated carbon fiber of about 10 μm diameter and specific surface area of 2300 m$^2$/g (BET method), and it is chopped into 1–15 mm lengths and used. Especially in case an organic electrolytic solution is used as the electrolytic solution, ion radius of the electrolyte is larger than in a water soluble electrolyte, and when the pore diameter of the activated carbon fiber is below 20 Å an effective forming of a electric double layer at an interface between the electrolytic substance and the activated carbon fiber becomes impossible. Activated carbon fiber of the present invention preferably has a high specific surface of 500–3000 m$^2$/g, and pore diameter distribution of 20–40 Å, and pore volume is preferably 0.2–1.5 CC/g. A more preferable range is that the specific area is 1500–3000 m$^2$/g, and that pore volume of pores distributing in the pore diameter of 20–40 Å is 0.6–1.5 CC/g; and the percentage of pores which distribute in 20–40 Å diameter to the internal surface area is above 40%. In such instances, and immersion of electrolyte into the pores becomes easy and the area of double layer formation increases. The activated carbon fiber under such conditions does not show a decrease of double layer formation region even when the viscosity of the electrolyte increases in a low temperature.

(2) Binding medium:

The binding medium of polarizable electrode body used in this invention is natural fibers, such as Manila hemp or kraft pulp, or artificial fibers of resins, such as polypropylene, polyethylene or acryl. Fibers of 2–5 mm length which is above ordinal ones or one proceeded to beating for unbinding is used. Degree of unbinding is usually represented by Canadian standard freeness value (CSF). In the binding medium of the embodiment, a pulp having CSF value of 0–500 ml is used. Furthermore, asbestos or glass fiber may be mixed in order to improve mechanical strength.

(3) Conductivity improvement agent:

The following conductivity improving agent may be used as an agent to improve the conductivity of the polarizable electrode body and at the same time to strengthen the electrode body.

1. Carbon fiber.

The carbon fiber has higher electric conductivity and larger strength than the activated carbon fiber. As for the kinds thereof, phenolic type, acrilonitrile (PAN) type and pitch type are preferable.

2. Metal fiber.

Stainless or nickel metal fiber of 1–20 μm diameter and 1–10 mm length chip shape.

3. Metal-plated carbon fiber.

That which is made by non-electrolytic plating on carbon fiber so as to retain flexibility and further to raise electric conductivity.

4. Micellaneous.

Graphite powder, carbon fiber, carbon black, metal-plated powder resin, or the like.

(4) Conductive electrode (conductivity layer):

The conductive electrode (conductive layer) used in the present invention is formed on the polarizable electrode by plasma spraying, arc spraying, non-electrolytic plating, vapor deposition, spraying, or the like. On the polarizable electrode, a conductive paint may be coated. Furthermore, as an auxiliary collector, metal foil, especially aluminum etched foil or the like, is suitable. As the conductive electrode material, aluminum, nickel and stainless which are electro-chemically stable, is suitable.

Figure 3:
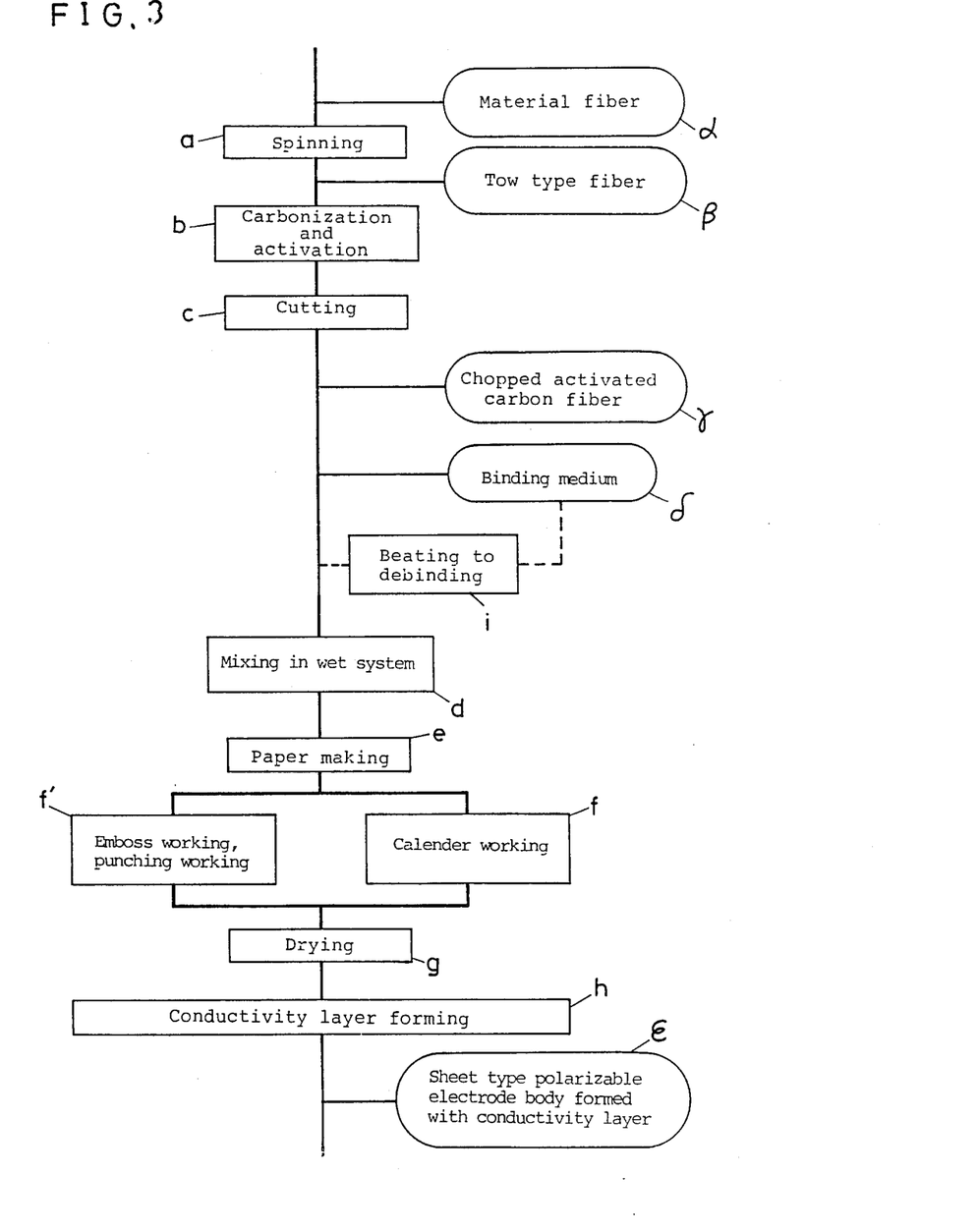
FIG. 3 is manufacturing flow chart of a polarizable electrode body in accordance with the embodiment of the present invention.

Next, a method for making the polarizable electrode is elucidated. FIG. 3 shows a manufacturing flow chart for a sheet shape polarizable electrode body of the present invention. Phenolic resin, polyacrilonitrile (PAN) resin or rayon is used as material fiber (α), and by means of a spinning step (a) tow type fiber (β) is obtained. Incidentally, as for the fiber, not only tow type fiber but also either type of felt type, non-woven fabric type or woven fabric type may be adopted. The above-mentioned fiber is activated by steam under an inert gas atmosphere such as nitrogen, to make the activated carbon (b). Next, the activated carbon fiber obtained in the carbonization and activation step (b) is cut into 1–5 mm lengths to suit for paper-making. The cutting may be made in the air, but it is desirable to grind in water by using water as a medium since unless so doing the powder dust will disperse and too fine a powder will be produced; and in the cutting, a mixer or guillotine cutter is used in order not to produce fine powder. It is desirable that the cut activated carbon fiber has a ratio of fiber length to fiber diameter of 2–3000 times, and a ratio of 50–500 times is best. The chop type activated carbon fiber (γ) obtained in this way and the binding medium (δ) are mixed in a wet system (d). At this time, a conductivity improvement agent may be added, and as a binder medium, that which is added with the beating step (i) may be used. As a dispersing agent to fluently proceed the step in the next paper-making step (e), polyethylene oxide of about 0.1 weight % of the paper making amount as dispersing agent, and fatty acid amide of about 0.01 weight % as defoaming agent, and furthermore as emulsifier consisting of polyethylene ester and dehydration accelerating agent of about 0.3 weight % are added, and they are mixed in a wet system by a suitable amount of water (d). After paper making (e) and a subsequent drying step (g), the web enters a conductivity layer forming step (h), and it is desirable that embossing and punching or calendaring (f, f') is made during drying. After passing through the above-mentioned steps, the sheet type polarizable electrode body formed with conductive layer (e) is completed.

In case the composition ratio of the activated carbon fiber and the binding medium is considered, when amount of the binding medium decreases, a capacitor having a small impedance and high capacity density is obtainable, though the relative strength of the polarizable electrode body decreases. On the other hand, when the binding medium reaches 70%, the resistance of the polarizable electrode body increases, thereby making a capacitor of large internal resistance, which is undesirable. On the contrary, when the binding medium becomes 10% or lower, the mechanical strength of the polarizable electrode body decreases, thereby causing many cracks inside the polarizable electrode body or making it easily damaged when forming the conductivity layer by a plasma spraying method. Accordingly, it is preferable to use one containing 30-90% of activated carbon fiber, and more preferable to use one containing 50-80% of the activated carbon fiber.

In order to raise the density of the sheet type polarizable electrode body, it is possible to calendar the sheet, thereby to increase capacity per unit volume and besides decrease resistance of the electrode body, thereby further decreasing internal resistance of the capacitor. If the calendaring is performed too intensely, the surface of the polarizable electrode body is liable to become finely powdered. The density of the polarizable electrode body can be increased to a degree of about 0.7 g/cm$^3$, but it is preferably 0.2-0.6 g/cm$^3$. Due to the calendaring, the possibility of contacting the activated carbon fibers with each other in the polarizable electrode body thereby to increase the path for passing current, and accordingly effective removal of the charged double layer capacitance becomes possible; and therefore, a capacitor having small I·R drop even at strong discharging can be made. As the thickness of the polarizable electrode becomes thicker, the current collecting ability becomes correspondingly smaller, and in the capacitor of the present invention a polarizable electrode body of a density as high as possible and of a small thickness (preferably 600 μm or lower) is suitable.

By embossing or punching the sheet type polarizable electrode body, not only the strength of the electrode body increases but also the conductive body is formed to inner walls of small holes besides the surface when the conductive layer is formed on the electrode body. By doing so, current collecting ability in the thickness direction very much improves, and besides, swelling of the polarizable electrode body by the electrolyte can be prevented, and increase of the internal resistance after long service time can be greatly lowered. The small holes may be 0.5-3 mm, but those of about 1.0 mm diameter and 1.5 mm pitch are effective and those which are penetrating are more effective.

Next, concrete examples are described.

[EXAMPLE 1]

By mixing chopped type phenol type activated carbon fiber (10 μmφ, 1-5 mm length) which has a specific surface area of 2300 m$^2$/g in a BET method, a pore volume of 1.1 CC/g is obtained and a contribution of 40% or more is made by the pore volume of pores of 20-40 Å to the whole pore volume, a binding medium comprising a mixture of Manila hemp (CSF value 460 ml) and kraft pulp (CSF value 0 ml), polyethylenoxide (dispersant) of 0.1 weight % of paper making amount, fatty acid amide (deformant) of 0.01 weight %, an emulsifier comprising ester of polyethylene of 0.3 wt % and a dehydrating agent with an appropriate amount of water; and by using and ordinary paper-making method, sheet type polarizable electrode bodies of components, which are shown in Table 1 by weight ratio of activated carbon fiber and binder medium, are obtained. All of the thicknesses of the polarizable electrode bodies shown in Table 1 are 100 μm and their weights are 40 g/m$^2$. An approximately 80 μm aluminum conductive layer is formed on one side each of the polarizable electrode bodies by using a plasma spraying method. By using two sheet type polarizable electrode bodies having this conductive layer, a coin type electric double layer capacitor is made. Capacitor construction of this embodiment uses mixed-papered matter of Manila hemp and glass fiber as the separator 7, stainless steel (SUS 444 or SHOMAC (brand name of Showa Denko Kabushiki Kaisha of Japan)) as positive electrode side sealing plate 6 end stainless (SUS 304) as the negative side case 5. A face having the conductivity layer of the polarizable electrode body is disposed to contact the sealing plate and the case, and in order to make positioning of the polarizable electrode body and electric connection to a certain manner, spot welding is made. After disposing the polarizable electrode bodies 3 to oppose each other with the separator 7 in between, propylenecarbonate solution containing 1 mol tetraethylammonium perchlorate is filled, and the positive and negative electrodes are insulated by a gasket 8, and sealing of case by caulking (i.e. squeeze-forming, e.g. crimping) is made. The polarizable electrode body of the present invention is of a circular shape, and its diameter is 14 mm, and the separator has 60 μm thickness and is of the same circular shape of 17 mm diameter, and 150 μl of electrolyte is used. The size of the coin type electric double layer capacitor after sealing the casing is 20 μm in diameter and 1.6 mm in height. In Table 1, together with their compositions, their relative strengths, capacitances and impedance values (measured at 1 kHz) are shown. Sample No. 8 shown in Table 1 is of an activated carbon fiber cloth material, and it was impossible to make such a thin matter of 40 g/m$^2$ as in the present embodiment. When organic electrolyte is used as an electrolyte as in the present embodiment, breakdown voltage of the capacitor becomes 2.0-2.4 V.

TABLE 1

| Sample No. | Mixed weight ratio of activated carbon fiber and binding medium | | Relative strength of polarizable electrode body | Capacitance (F) | Impedance (Ω) [at 1 kHz] |
|---|---|---|---|---|---|
| | Activated carbon fiber | Binding medium | | | |
| 1 | 30 | 70 | Large | 0.12 | 58.2 |
| 2 | 40 | 60 | Large | 0.16 | 40.1 |
| 3 | 50 | 50 | Large | 0.19 | 32.4 |
| 4 | 60 | 40 | Large | 0.22 | 18.2 |
| 5 | 70 | 30 | Middle | 0.28 | 10.6 |

TABLE 1-continued

| Sample No. | Mixed weight ratio of activated carbon fiber and binding medium | | Relative strength of polarizable electrode body | Capacitance (F) | Impedance (Ω) [at 1 kHz] |
| --- | --- | --- | --- | --- | --- |
| | Activated carbon fiber | Binding medium | | | |
| 6 | 80 | 20 | Middle | 0.31 | 5.9 |
| 7 | 90 | 10 | Small | 0.36 | 4.8 |
| 8 | 100 | 0 | — | — | — |

[EXAMPLE 2]

A sheet type polarizable electrode body having a component, wherein the weight ratio of the activated carbon fiber and binding medium is 80:20 in the sample No. 6 of Table 1 of the Example 1, is calendared during manufacturing thereof to increase the density of the electrode body, is used and a coin type capacitor of the same size as in the Example 1 is manufactured. The construction other than density of the electrode body, is similar to the Example 1. Table 2 shows characteristics of the product polarizable electrode body used in this example and various characteristics of the capacitor made by using these together. In every one, weight per unit area is 120 g/m². As sample goes from No. 1 to No. 4, the impedance value becomes lower and strong discharging becomes easy, thereby improving the characteristics.

TABLE 2

| Sample No. | Characteristics of polarizable electrode body | | Characteristics of capacitor | | |
| --- | --- | --- | --- | --- | --- |
| | Thickness (μm) | Density (g/cm³) | Capacitance (F) | Impedance (Ω) | Strong discharging ability |
| 1 | 590 | 0.20 | 0.92 | 5.3 | Good |
| 2 | 455 | 0.26 | 0.93 | 5.1 | ↓ |
| 3 | 305 | 0.39 | 0.93 | 4.4 | ↓ |
| 4 | 210 | 0.57 | 0.93 | 4.2 | ↓ |

[EXAMPLE 3]

On one side of a polarizable electrode body similar to the component shown in FIG. 1 of the Example 1, a conductive paint, which has carbon as conductive granules in place of the aluminum-sprayed conductive body of the Example 1 and a butyl-type resin as binding medium, is applied to about 50 μm thick by using a screen printing method, and dried at 120° C., to make the conductive layer of the present invention. When a trial coin type capacitor is trial made making the conditions of electrolyte, casing, etc, about the same capacitor value as that of the Example 1 is obtained, while the impedances of the present embodiment show 30-50% larger values in comparison with that of Example 1. It is considered that because the metal conductive layer has stronger bonding to the polarizable electrode body and because of having difference of resistance values of the conductive body per se.

[EXAMPLE 4]

By using chopped type phenol type activated carbon fiber (ACF) (having a specific surface area of 1800 m²/g by a BET method and pore volume of 0.7 CC/g) and polypropylene synthetic resin pulp as binding medium, a sheet type polarizable electrode body having weight ratio of ACF/binder medium of 70/30, thickness of 270 μm and weight per unit area of 60 g/m², is formed by conventional paper making method, and a nickel conductive body layer of 150 μm is formed on one surface of this electrode body by a plasma spraying method. By using a non-woven fabric of polypropylene as its separator and 24 wt % potassium hydroxide as its electrolytic solution, a coin type capacitor of a similar type to that of Examples 1-3 is made. When an aqueous type electrolyte as in this Example is used, though its breakdown voltage can not be made above 1.23 V which is the theoretical decomposition voltage of water, the conductivity becomes higher by two figures in comparison with the non-aqueous type ones, and a capacitor which is splendid in strong discharging characteristic is possible; and since the sizes of anions and cations are smaller than ions of the perchloric acid, invasion of ions into the insides of the fine pores of activated carbon fiber is easy, and the effective double layer forming region expands. Though the strength of the polarizable electrodes of that which uses polypropylene synthetic resin pulp as the binding medium is stronger than that using the natural pulp, resistance value of the electrode body per se increases.

TABLE 3

| Mixing weight ratio of activated carbon fiber and binding medium | | Capacitance (F) | Impedance (Ω) [at 1 kHz] | Breakdown voltage (V) |
| --- | --- | --- | --- | --- |
| Activated carbon fiber | Binding medium | | | |
| 70 | 30 | 1.6 | 2.0 | 1.2 |

[EXAMPLE 5]

In a long storage, the natural pulp swells up to some extent due to the electrolytic solution, and the gap between the activated carbon fibers expands, and accordingly the internal resistance increases and taking out of the capacitance becomes difficult. And when in place of natural pulp (mixture of Manila hemp and kraft pulp) only artificial pulp (made of polypropylene) is used, the artificial pulp having a large resistance when a nonaqueous type solvent is used for the electrolyte, a satisfactory capacitance characteristic is not obtained. Accordingly in the present example, the natural pulp and the artificial pulp are mixed as shown in Table 4, and weight ratio of the activated carbon fiber and binding medium is made 70/30 in paper making, thereby the strength of the polarizable electrode body is increased. With respect to Samples No. 1-5 of Table 4, similarly to Example 1, a conductive body layer of aluminum is formed and a coin type capacitor is made with a similar electrolytic solution type, and a reliability acceleration test is made by applying 2.0 V all the time under an atmosphere of 70° C. on this capacitor, and the capacity change rate after 1000 hours is shown in Table 4. That which has mixed artificial pulp after beating and debinding is made to natural pulp has a little increased strength and reliability improves. The sample No. 5 which does not use the natural pulp at all has a large resistance of the polarizable electrode body and capacity change rate is large, too.

TABLE 4

| Sample No. | Weight composition of polarizable electrode body | | | Characteristics of capacitor | |
|---|---|---|---|---|---|
| | Activated Carbon fiber | Natural pulps (Mixture of Manila hemp and kraft pulp) | Artificial pulp | Capacitance (F) | Reliability test Capacitance change rate (%) after 1000 hrs. |
| 1 | 70 | 30 | 0 | 0.28 | −7.3 |
| 2 | 70 | 25 | 5(polypropylene) | 0.28 | −7.1 |
| 3 | 70 | 20 | 10(polypropylene) | 0.28 | −7.1 |
| 4 | 70 | 20 | 10(polypropylene) | 0.28 | −7.2 |
| 5 | 70 | 0 | 30(polypropylene) | 0.28 | −11.3 |

TABLE 5

| Sample No. | Kinds of carbon fiber | Carbon content (wt %) | Specific resistivity ($\times 10^{-5} \Omega \cdot cm$) | Tensile strength (kg/mm$^2$) | Modulus of elasticity (kg/mm$^2$) |
|---|---|---|---|---|---|
| 1 | Phenol type | 94.0 | 1,000–3,000 | 65 | 3,500 |
| 2 | Polyacrilnitril type | 92.6 | 800–1,000 | 150 | 14,500 |
| 3 | Coal tar pitch type | 94.3 | 2,000–3,000 | 60 | 3,500 |

TABLE 6

| Sample No. | Kinds of activated carbon fiber | Specific surface area (m$^2$/g) | Pore volume (cc/g) | Pore diameter distribution (Å) | Fiber strength (relative value) |
|---|---|---|---|---|---|
| 1 | Phenol type | 2,300 | 1.2 | 20–40 | Strong |
| 2 | Rayon type | 600 | 0.30 | 20–30 | Week |
| 3 | Polyacrilnitril type (Pan type) | 700 | 0.36 | 20–80 | Week |
| 4 | Coal tar pitch type | 630 | 0.33 | 20–30 | Medium |

[EXAMPLE 6]

In order to raise the electric conductivity of the sheet type polarizable electrode body and to take out charge stored on the surface of the activated carbon fiber with good efficiency, various kinds of carbon fibers are mixed to the compositions set forth in the Examples 1–5.

In Table 5, various characteristics of the various kinds of carbon fibers are shown. In the type which contains paper making step as in this type, phenol type carbon fiber of No. 1 in the Table 5 is most suitable. Though there is carbon fiber of rayon type besides those shown in the Table 5, this one is no good in carbonization yield and mechanical strength. PAN type one of Sample No. 2 has high elasticity and poor workability in paper making and when one tries to make a capacitor the carbon fiber becomes nappy and the possiblity of short circuiting by penetration through a separator is higher in comparison with Sample No. 1. Pitch type one of Sample No. 3 does not have flexibility, and gives a similar effect to that of Sample No. 2 to the capacitor.

In Table 6, various coin type capacitors similar to those of Example 1 are made by using polarizable electrode bodies having various compositions. Details of the capacitors of the present example are listed as follows:

Electrolytic solution ... propylenecarbonate (PC) solution containing 1 mol (C$_2$H$_5$)$_4$NBF$_4$, 150 µl.

Separator ... 70 µm thick non-woven fabric of polypropylene, of 17 mmφ circular type.

Polarizable electrode body ... 350 µm thick, weight per unit area: 120 g/m$^2$, composition is as in Table 7, shape is 14 mmφ circular type.

Conductive layer ... 150 µm thick aluminum layer formed by plasma spraying.

Table 7 shows compositions of polarizable electrode body and various characteristics when it is assembled in a coin type capacitor. From the Table, it is understood that, in general, low impedance and low internal resistance are obtainable by mixing any kinds of carbon fiber. Especially, the phenol type ones are soft and flexible, hence easily disperse uniformly in the sheet type polarizable electrode body, and a splendid one is obtainable. In Table 7, PP designates polypropylene, PE polyethylene and pulp designates a mixture of Manila hemp and kraft pulp. And numeral values of reliability acceleration tests show capacity change rates after continuous charging of 1000 hours of 2.0 V at 70° C. Accordingly, the smaller the absolute value is, the higher the reliability is. In Table 6, various characteristics of four kinds of activated carbon fibers are shown. Since the electric double layer is formed at an interface between the activated carbon fiber and the electrolyte, the activated carbon fiber of the phenol-type is most suitable; and since pore diameters of 20–40 Å are necessary in order that tetraethylammonium ions ((C$_2$H$_5$)$_4$N$^+$) or borofluoride ions (BF$_4^-$) invades into pores of the activated carbon fibers to effectively form the double layer, the phenol type one is suitable also from this point of view. Sample No. 3 of PAN type shown in Table 6 has pore diameter distribution centering in larger diameter part, but it is very difficult to raise the specific surface area above 1000 m$^2$/g, and the electric resistance is large, and it cannot be said to be suitable for the polarizable electrode body of a capacitor.

TABLE 7

| Sample No. | Kind of polarizable electrode body and Weight component | | | Capacitance (F) | Impedance (Ω) [at 1 KHz] | Reliability acceleration test |
|---|---|---|---|---|---|---|
| | Activated carbon fiber (%) | Carbon fiber (%) | Binding medium (%) | | | |
| 1 | Phenol type 80 | Phenol type 10 | Pulp 10 | 0.32 | 5.1 | −4.3 |
| 2 | Phenol type 70 | Phenol type 20 | Pulp 10 | 0.28 | 5.9 | −4.9 |
| 3 | Phenol type 70 | Phenol type 20 | PP 10, Pulp 10 | 0.28 | 7.4 | −6.2 |
| 4 | Phenol type 60 | Phenol type 20 | Pulp 20 | 0.24 | 6.1 | −4.8 |
| 5 | Phenol type 60 | Phenol type 20 | PE 10, PET 10 | 0.24 | 7.8 | −6.3 |
| 6 | Phenol type 60 | Phenol type 20 | Pulp 20 | 0.24 | 5.2 | −5.3 |
| 7 | Phenol type 50 | Phenol type 30 | Pulp 20 | 0.20 | 4.3 | −4.1 |
| 8 | Phenol type 40 | Phenol type 40 | Pulp 20 | 0.16 | 4.2 | −4.0 |
| 9 | PAN type 60 | Phenol type 20 | Pulp 20 | 0.12 | 7.9 | −8.4 |
| 10 | PAN type 60 | PAN type 20 | Pulp 20 | 0.12 | 7.8 | −8.2 |
| 11 | PAN type 60 | Rayon type 20 | Pulp 20 | 0.12 | 7.9 | −8.3 |
| 12 | Rayon type 60 | Phenol type 20 | Pulp 20 | 0.11 | 8.1 | −9.9 |
| 13 | Rayon type 60 | PAN type 20 | Pulp 20 | 0.11 | 8.0 | −9.9 |
| 14 | Rayon type 60 | Rayon type 20 | Pulp 20 | 0.11 | 8.1 | −9.8 |
| 15 | Pitch type 60 | Phenol type 20 | Pulp 20 | 0.10 | 8.2 | −10.2 |
| 16 | Phenol type 100 | 0 | 0 | 0.40 | 6.0 | −9.8 |

Figure 4:
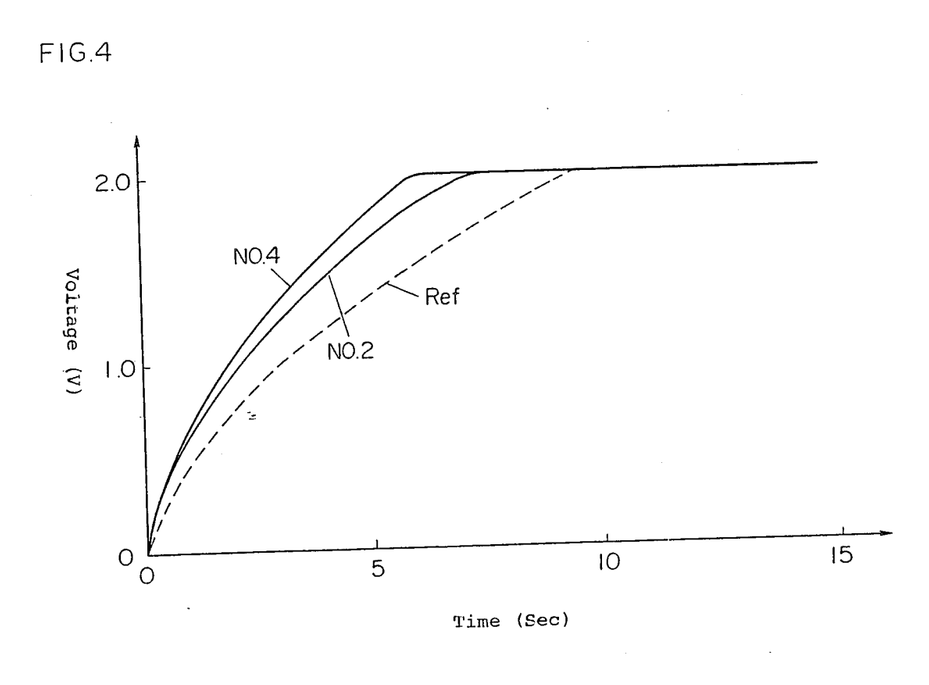
FIG. 4 is a charging curve diagram of capacitors in accordance with the present invention and comparison example.

In Table 7, it is clear that ones using activated carbon fiber and carbon fiber of phenol type of Samples No. 1-8 have good capacitor characteristics. Further it is obvious that as the amount of content of carbon fiber is increased, impedance decreases, the internal resistance also decreases, and the conductivity of the electrode body is improved and reliability is also improved. Furthermore, in comparison with the activated carbon fiber cloth of the Sample No. 16, the capacitor of the present example has better characteristics. FIG. 4 shows charging curves of one wherein carbon fiber as the conductivity improving agent like the above-mentioned one is not mixed (comparison sample) and Sample Nos. 2 and 4 shown in Table 7. It is obvious that the present example has a shorter charging time. Incidentally, the capacitor used in the measurement of FIG. 4 controls the weight of the polarizable electrode body, and has the same capacitance value.

[EXAMPLE 7]

For the purpose of improvement of conductivity of a polarizable electrode body, the following (a), (b) and (c) are used in the proportion as shown in Table 8 and Table 9, to constitute the polarizable electrode body: (a) activated carbon fiber (length 2-3 mm, diameter 10 μm) having a 50% or higher distribution of pore diameters of 20-40 Å which is obtained by carbonization and activation of phenol type hardened novolak resin fiber and having specific surface area of 2200 m²/g (BET method), (b) binding medium such as natural pulp (mixture of Manila hemp and kraft pulp) or artificial pulp (polyethylene or polypropylene fiber), (c) graphite granules of high electric conductivity formed by 2000° C. or above or carbon black and conductive granules which is made by non-electrolytic nickel plating on phenol fine powder resin. Constituent members, weight ratios, binding medium and electrolytic solution and electrolyte are shown in Table 8 and Table 9.

TABLE 8

| No. | Polarizable electrode body | | Electrolytic solution | | Capacitance (F) | Impedance (Ω) [at 1 KHz] | Capacitance change rate (%) after 1000 hrs. charging of 2 V, under 70° C. |
|---|---|---|---|---|---|---|---|
| | Amount of Powder graphite (Weight %) | binding medium (weight %) | Electrolyte | Solvent | | | |
| 1 | 0 | Pulp 20 | $(C_2H_5)_4NClO_4$ | Propylene-carbonate | 0.63 | 6.8 | −21.5 |
| 2 | 0.5 | Pulp 19.5 | $(C_2H_5)_4NClO_4$ | Propylene-carbonate | 0.64 | 6.0 | −18.0 |
| 3 | 1 | Pulp 19 | $(C_2H_5)_4NClO_4$ | Propylene-carbonate | 0.64 | 5.1 | −14.0 |
| 4 | 5 | Pulp 15 | $(C_2H_5)_4NClO_4$ | Propylene-carbonate | 0.63 | 4.3 | −13.0 |
| 5 | 10 | Pulp 10 | $(C_2H_5)_4NClO_4$ | Propylene-carbonate | 0.64 | 3.2 | −11.3 |
| 6 | 20 | Pulp 10 | $(C_2H_5)_4NClO_4$ | Propylene-carbonate | 0.57 | 2.6 | −10.3 |
| 7 | 10 | Polyethylene 15 | $(C_2H_5)_4NBF_4$ | Propylene-carbonate | 0.6 | 4.2 | −16.2 |
| 8 | 10 | Polyethylene 15 | $(C_2H_5)_4NDF_6$ | Propylene-carbonate | 0.6 | 4.1 | −15.9 |
| 9 | 10 | Polyethylene 15 | $LiClO_4$ | γ-buthyllactone | 0.6 | 4.3 | −16.0 |
| 10 | 10 | Polypropylene 15 | KOH | | 1.2 | 1.3 | −15.0 |
| 11 | 10 | Polypropylene 15 | $H_2SO_4$ | | 1.2 | 1.2 | −14.6 |
| 12 | 10 | Polypropylene 15 | NaOH | | 1.2 | 1.6 | −13.9 |

Table 8 shows the difference of capacitor characteristics depending on amount of addition in case of adding powdered graphite as a conductivity improving agent and an electrolytic solution. The capacitors are coin type ones having the similar shape as a Example 1, wherein as separator polypropylene non-woven fabric (17 mmφ and 60 μm), thickness of the polarizable electrode is 450 μm, electrode diameter is 14 mmφ, weight per unit area is 80 g/m² is used, and as a conductive layer an aluminum plasma spraying layer for organic electrolytic solution type ones and nickel spraying layer for aqueous electrolytic solution type are formed. From Table 8, all of the samples 1-12 show good capacitor characteristics, and particularly when the graphite amount is about 5-10%, and at least 1% or more is contained, lowering of the impedance is observed and an effect of conductivity improvement is observed.

In $(C_2H_5)NBF_4$/propylenecarbonate type ones, the breakdown voltage is about 2.8 V, while in the aqueous type ones it is about 1.0 V. As the graphite amount increases, the electric characteristics gradually improve, but the electrode strength decreases, and preferably about 10 weight % of content amount is good. In a reliability test made by 2 V application under 70° C. atmosphere, change rate of 1000 hours after from the initial capacitance becomes smaller as the graphite amount is more.

Next, by using conductive granules which are made of (a) carbon black and (b) nickel-plating on phenol fine powdered resin instead of powdered graphite, similar coin type capacitors are made with polarizable electrode body components shown in Table 9, and their characteristics are measured. Activated carbon fiber amount is 70 weight % of the whole.

weight ratio of Table 10, and made into paper, under a condition not to make non-uniformity due to difference of specific gravity. The characteristics of the activated carbon fibers mixed are those described in Table 6 of Example 6. On the sheet type polarizable electrode body thus formed, a conductivity layer of aluminum or nickel is formed to 100 μm on one side by using a plasma spraying method. Capacitors made in the present example are of a coin type of the same size as Examples 1–7.

TABLE 10

| Sample No. | Polarizable electrode body | | | | Electrolytic solution | | Capacitance (F) | Impedance (Ω) [at 1 KHz] | Capacitance change rate (%) after 1000 hrs. charging of 2 V, under 70° C. (%) |
|---|---|---|---|---|---|---|---|---|---|
| | Activated carbon fiber (wt %) | Metal short fiber (wt %) | Binding medium (wt %) | Conductive layer | Electrolyte | Solvent | | | |
| 1 | Phenol type 70 | 0 | Natural pulp 30 | Aluminum | $(C_2H_5)_4NClO_4$ | Propylene carbonate | 0.28 | 10.6 | −7.3 |
| 2 | Phenol type 70 | Stainless 5 | Natural pulp 25 | Aluminum | $(C_2H_5)_4NClO_4$ | Propylene carbonate | 0.285 | 8.3 | −6.8 |
| 3 | Phenol type 70 | Stainless 10 | Natural pulp 20 | Aluminum | $(C_2H_5)_4NClO_4$ | Propylene carbonate | 0.284 | 8.0 | −6.7 |
| 4 | Phenol type 60 | Stainless 20 | Natural pulp 20 | Aluminum | $(C_2H_5)_4NClO_4$ | Propylene carbonate | 0.24 | 7.6 | −6.3 |
| 5 | Phenol type 40 | Stainless 30 | Natural pulp 30 | Aluminum | $(C_2H_5)_4NClO_4$ | Propylene carbonate | 0.15 | 6.5 | −6.0 |
| 6 | Phenol type 60 | Stainless 20 | Natural pulp 20 | Aluminum | $(C_2H_5)_4BF_4$ | γ-buthyl-lactone | 0.25 | 7.8 | −6.0 |
| 7 | Phenol type 60 | Nickel 20 | Propylene 20 artificial pulp | Nickel | KOH | | 0.51 | 4.0 | −7.8 |
| 8 | PAN type 60 | Stainless 20 | Natural pulp 20 | Aluminum | $(C_2H_5)_4NClO_4$ | Propylene carbonate | 0.12 | 7.9 | −10.6 |
| 9 | PAN type 60 | Stainless 20 | Natural pulp 20 | Aluminum | $(C_2H_5)_4NClO_4$ | Propylene carbonate | 0.12 | 7.8 | −9.9 |
| 10 | Pitch type 60 | Stainless 20 | Natural pulp 20 | Aluminum | $(C_2H_5)_4NClO_4$ | Propylene carbonate | 0.10 | 9.0 | −11.0 |

From Table 10, even when the metal short fiber of the present example is mixed, the conductivity is improved and impedance is also lowered, and in the reliability test under 70° C. atmosphere and 2 V changing, a moderate improvement is observed.

[EXAMPLE 9]

A sheet type polarizable electrode body having as its principal component phenol type activated carbon fibers having compositions of 80 to 20 weight ratio of the activated carbon fiber and binding medium of Sample

TABLE 9

| Polarizable electrode body | | | | | | |
|---|---|---|---|---|---|---|
| Conductivity improving agent (wt %) | Binding medium (wt %) | Electrolytic solution | | Capacitance (F) | Impedance (Ω) [at 1 KHz] | Capacity change after 1000 hrs. of 2 V charging at 70° C. |
| | | Electrolyte | solvent | | | |
| a carbon black 10 | 20 | $(C_2H_5)_4NClO_4$ | Propylene carbonate | 0.56 | 3.1 | −13.3 |
| b conductive granules 10 | 20 | KOH | | 1.13 | 1.3 | −15.4 |

From Table 9 it is obvious that also with the above-mentioned conductivity improving agent, a similar effect to that obtained using the graphite powder is obtainable.

[EXAMPLE 8]

Figure 5:
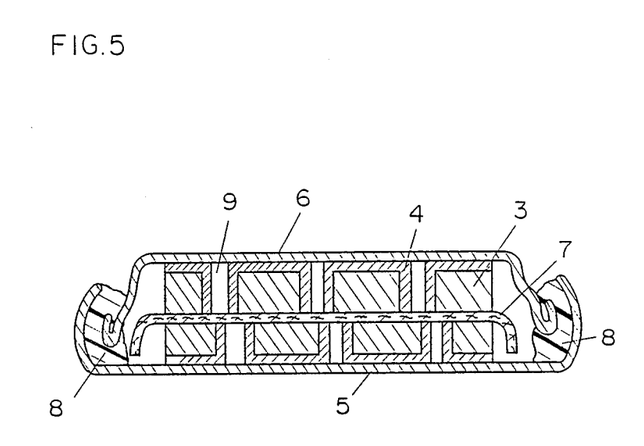
FIG. 5 is a sectional configuration view of a coin type capacitor of an embodiment of the present invention.
Figure 6:
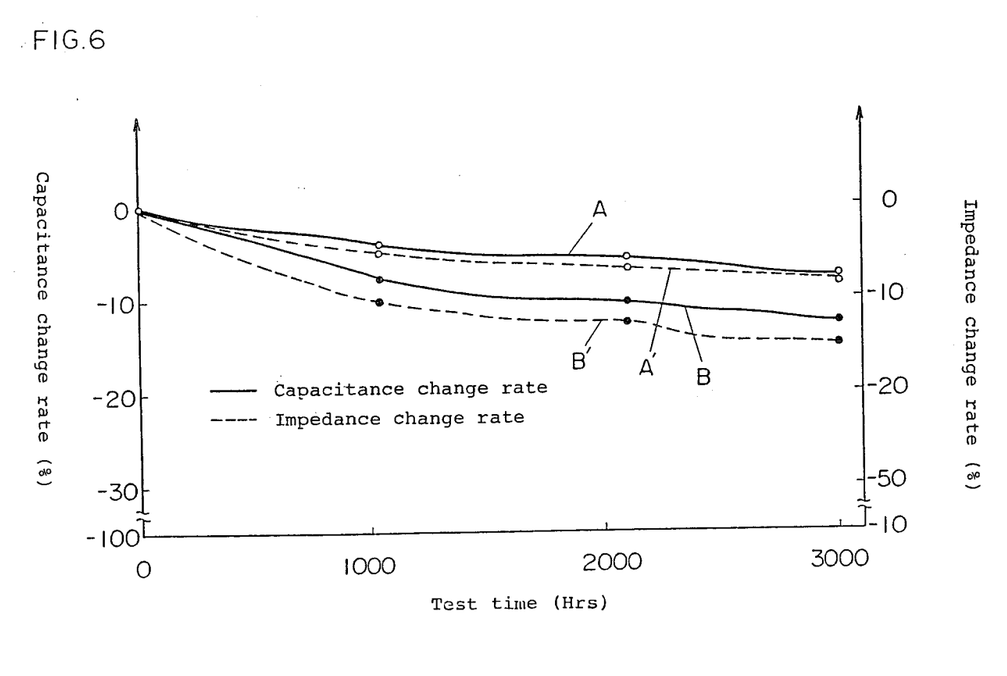
FIG. 6 is an impedance change characteristic chart of a capacitor of an embodiment of the present invention and a comparison example.

As a polarmizable electrode body, (a) activated carbon fiber of Table 10, (b) as conductivity improving agent, chopped type metal fiber (stainless steel, aluminum, nickel, etc.) of 1–20 μmφ and 1–10 mm length from a cylinder by so-called bibiri-vibration method and (c) binding medium consisting of natural pulps (mixture of Manila hemp and kraft pulp) are mixed well in a No. 6 shown in Table 1 of Example 1, is calendared worked, to raise its density to 0.5 g/cm³, and to raise weight per unit area to 120 g/m², and by punching and through forming, small holes of 1.0 mm are made with 1.5 mm pitch on this polarizable electrode body, and an aluminum metal conductor layer is formed thereon, and an electric double layer capacitor having the above as constitutive element is shown in FIG. 5. The same elements as shown in FIG. 2 are designated by the same numerals. 9 is a small hole and 3 is a sheet type polarizable electrode body. In this constitution, metal conductor layers 4 are spot welded to metal seal plate 6 and metal case 5 which is a sealing case, and they are disposed to oppose with a separator 7 of polypropylene in between, and as electrolytic solution, 1 mol propylenecarbonate solution containing 1 mol $(C_2H_5)_4NBF_4$ is used and positive and negative electrodes are insulated by gasket 8, and sealing of casing is completed. The size of the polarizable electrode body of the present example is 6 mm diameter, and the size after the sealing of casing is 12.0 mm diameter and 1.5 mm thickness. Capacitance is 0.12 F. As a comparison example to the present example, by using polarizable electrode body of the same component as the present example but having no small holes, similar capacitors are made, and both are subject to reliability testing at 70° C. by impressing 2 V. The result is shown in FIG. 6. The ordinate shows the capacitance value and the abscissa shows testing time. In the graph, A shows the capacitance change of the present example and B the comparison example (having the same component as A but not having holes). A' and B' of FIG. 6 show impedance changes of the present example and the comparison example, respectively. In A', the impedance value is about half in comparison with B', and from the graph the present example has a small change and a very good capacitor characteristic is observed. In this example, aluminum plasma sprayed layer is only on one side and on the inner wall of the small holes, but even when the sprayed layer is formed on the inner walls of the small holes and on both surfaces, the characteristic is not much different from the present example.

[EXAMPLE 10]

Figure 7:
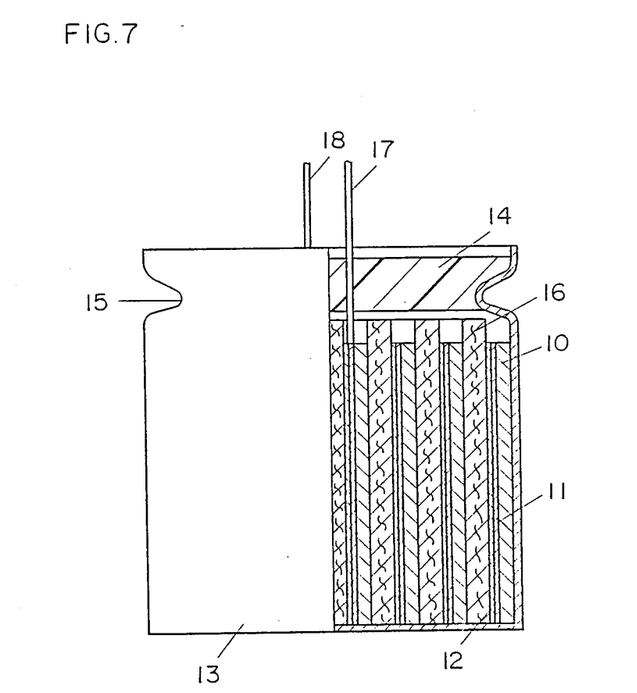
FIG. 7 is a partially sectionally configuration view of a wound type capacitor of an embodiment of the present invention.

Phenol type activated carbon fiber having the composition of Sample No. 6 shown in Table 1 (weight ratio of the activated carbon fiber and binding media is 80:20) is calendared make thickness to 260 μm and the weight per unit area 120 g, and a wound type capacitor of the constitution shown in FIG. 7 is made. The conductor layer is formed by spraying aluminum about 100 μm thickness. In the drawing, 10 is a sheet type polarizable electrode body, 11 is an aluminum conductor layer, 12 is a collector auxiliary foil, and the following two kinds of materials are examined. (1) Aluminum etching foil of 30 μm and (2) aluminum foil of 30 μm thickness. 13 is a aluminum casing, 14 is gum packing member, and after a filling propylenecarbonate electrolytic solution containing 1 mol $(C_2H_5)_4HClO_4$, a caulking per (i.e. squeeze-formed joint) 15 is formed and sealing is made. 16 is a separator made of polypropylene. In case no collector auxiliary member is used, aluminum leads 17 and 18 are spot welded directly to the sprayed aluminum layer. In case aluminum foil and etched foil are used as collector auxiliary member, the leads are caulked (i.e. squeeze-formed) thereto for connection. Table 11 shows using and non-using of the collector auxiliary members and various characteristics. The size of the sheet type polarizable electrode body used is: the positive side is 30 mm length and 200 mm width, and negative electrode side is 30 mm length and 210 mm width. From Table 11, even in the wound up type capacitor, a very high energy density and high reliability one can be made. It is observed that as the collector auxiliary member, etching foil, wherein the surface is rough and contact collecting with the conductor layer is best especially has high reliability. Furthermore, such one wherein the negative electrode side is made larger than the positive electrode side like the present example has higher reliability. When the electrode area becomes large as in the present example, discharging of 100 mA or more becomes easy.

TABLE 11

| Sample No. | Kinds of collector auxiliary member | Impedance (mΩ) [at 1 kHz] | Capacitance (F) | Capacitance change rate in reliability test (%) |
|---|---|---|---|---|
| 1 | 30 μm aluminum etching foil | 236 | 13.16 | −2.0 |
| 2 | 30 μm aluminum foil | 321 | 13.10 | −2.8 |
| 3 | None | 530 | 13.06 | −4.3 |
| 4 | None (activated carbon fiber cloth) | 930 | 10.01 | −5.0 |

As a comparison example, an aluminum conductor is formed on the activated carbon fiber cloth of Example No. 4 and a similar wound up type capacitor is made and its characteristics at that time are shown. The present example is a capacitor of larger capacitance and higher reliability. The capacity change rate of the present example is that capacitance after 1000 hrs. of charging 2 V to the capacitor at 70° C. is compared with the initial capacitance.

[EXAMPLE 11]

As a positive electrode side polarizable electrode body, an electrode having a similar composition as to the one of the Example 9 and having small holes is used, and as a negative electrode side nickel is made into a lattice and Wood metal containing lithium wherein the weight ratio of Sn/Cd is 85/15 is used, to produce a polarized capacitor. As an electrolytic solution, propylene carbonate solution containing 1 mol $LiClO_4$ is used. The polarizable electrode body is a 14 mm diameter one, and as lithium doping an amount of 10 mAh is used. Table 12 shows various characteristics of capacitors of the present examples. Though ones having a non-polarizable electrode body on the negative electrode side has a shortcoming of being weak against overdischarging; its breakdown voltage (voltage for use) is as high as 3.0 V, and energy density is also about 2 times large in comparison with those using polarizable electrode body both for positive and negative electrodes. Furthermore, it works as a capacitor even when lithium metal is used as the non-polarizable electrode body, lithium dendolite is produced as charging and discharging are repeated thereby drops off lithium and the capacitor characteristic is very much damaged. Further, even if an alloy of lithium-containing aluminum is used as the non-polarizable electrode body, in comparison with use of the lithium only, a capacitor having good reliability was obtained.

TABLE 12

| Capacitance (F) | Impedance (Ω) [at 1 kHz] | Reliability test of 3 V charging at 1000° C. capacity change rate (%) |
|---|---|---|
| 0.23 | 5.2 | −10.8 |

[EXAMPLE 12]

Figure 8A:
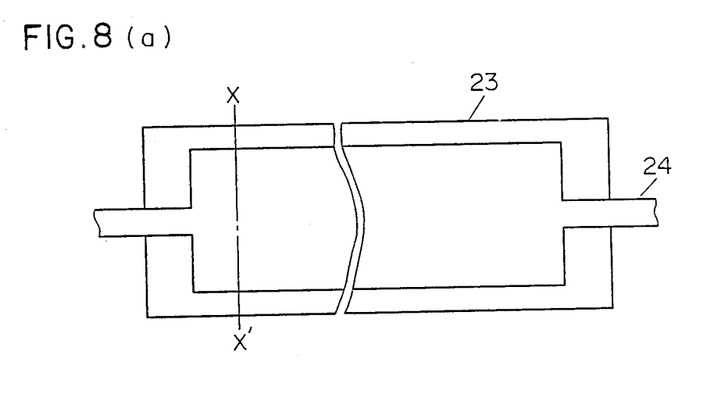
FIGS. 8a and 8b, are a plan view, respectively and sectional view of a sheet type capacitor of an embodiment of the present invention.
Figure 8B:
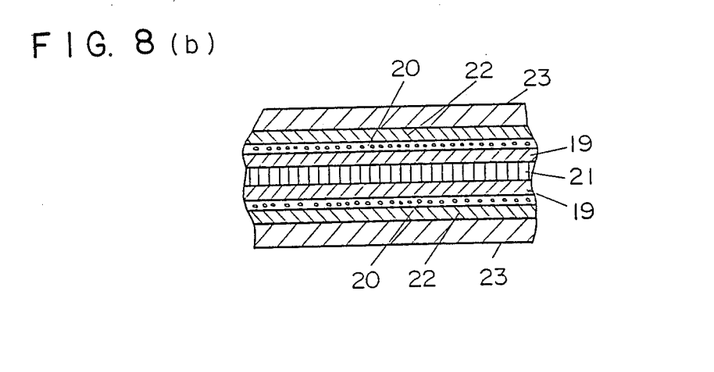

A sheet type polarizable electrode body having a composition of weight ratio of 80:20 in the Sample No. 6 of Table 1, a density of 0.5 g/cm$^3$ and thickness of 300 μm, and a capacitor shown in FIG. 8a and 8b are made. FIG. 8b shows a section taken on line X—X' of FIG. 8a. 19 is a sheet type polarizable electrode body of the above-mentioned construction, 20 is an aluminum conductive layer formed on the surface of a sheet type polarizable electrode body of 100 μm, 22 is a collecting auxiliary member consisting of stainless steel (SUS444) of 30 μm, 21 is a polypropylene separator of 50 μm thickness and 23 is a transparent coating layer of polypropylene of 200 μm thickness laminated with sheet type thermo-melting adhesive of denaturated polypropylene type. As electrolytic solution, 1 mol propylene carbonate solution containing 1 mol $(C_2H_5)_4NClO_4$ is used. The capacitor of this example has a good collecting ability and sufficient strength of polarizable electrode body, and even such a large size one as 100×200 mm$^2$ can be assembled with sufficient workability. Furthermore thermal fusing and adhering film sheet used as an adhesive in this example has strong bonding with metal and other plastics, and resistivity against organic solution is good. Table 13 shows caracteristics of the capacitor of the present example. Capacity decrease rate after 1000 times charge-discharge is small and reliability is high.

TABLE 13

| Impedance (mΩ) [at 1 kHz] | Capacitance (F) | Capacitance change after 1000 times charges and discharges (%) |
|---|---|---|
| 43 | 49.3 | −8.3 |

The polarizable electrode body of the present invention is usable not only as an electric double layer capacitor, but also as positive electrodes of an air-battery or lithium battery, or counter electrodes to oppose display electrodes of an electro-chromic display (ECD).

We claim:

1. A polarizable electrode body, comprising:
a non-woven sheet made from a mixture of at least activated carbon fiber having a fiber length to diameter ratio in the range of 10–3000 and a fibrous binding medium matted with said activated carbon fiber, said non-woven sheet having an electrically conductive substance provided on a surface thereof.

2. A polarizable electrode body in accordance with claim 1, wherein:
said sheet contains an electrically conductive substance.

3. A polarizable electrode body in accordance with claim 1, wherein:
said conductive body is at least one of carbon fiber, graphite fiber, metal fiber, metal-coated carbon fiber, metal-coated resin fiber, carbon powder and graphite powder.

4. A polarizable electrode body in accordance with claim 1, wherein:
the density of said sheet is at least 0.1 g/cm$^3$.

5. A polarizable electrode body in accordance with claim 1, wherein:
said binding medium constitutes no more than 60 wt% of said sheet.

6. A polarizable electrode body in accordance with claim 1, wherein:
said sheet has a plurality of through-holes provided therethrough.

7. A polarizable electrode body in accordance with claim 1, wherein:
said activated carbon fiber is selected from the group consisting of phenol-type, polyacrylonitrile-type, pitch-type and rayon-type activated carbon fiber.

8. A polarizable electrode body in accordance with claim 7, wherein:
said activated carbon fiber is polyacrylonitrile-type activated carbon fiber of specific surface area of at least 500 m$^2$/g.

9. A polarizable electrode body in accordance with claim 1, wherein:
said activated carbon fiber is two-type fiber which is carbonized and activated.

10. The polarizable electrode body of claim 1, wherein
said fibrous binding medium is made of natural fibers.

11. A polarizable electrode body, comprising:
a non-woven sheet made from a mixture of at least activated carbon fiber having a fiber length to diameter ratio in the range of 10–3000 and a fibrous binding medium matted with said activated carbon fiber;
said activated carbon fiber being phenol-type novolak resin fiber of specific surface area of 1000 m$^2$/g or more, which is carbonized and activated.

12. A method for making a polarizable electrode body characterized by:
obtaining activated carbon fiber by carbonizing and activating fiber;
chopping said activated carbon fiber to 1–5 mm lengths to make chopped-type fiber;
mixing said chopped-type activated carbon fiber and a fibrous binding medium with a liquid to form a slurry thereof; and
subsequently making paper sheet therewith.

13. A method for making a polarizable electrode body in accordance with claim 12, wherein:
activated carbon fiber made by carbonizing and activating tow-type fiber is used.

14. A method for making a polarizable electrode body in accordance with claim 13, wherein:
carbon fiber made by carbonizing tow-type fiber and activated carbon fiber made by carbonizing and activating tow-type fiber are cut into 1–5 mm lengths, and these cut lengths, fibrous binding medium and a liquid are mixed and made into said paper sheet.

15. A method for making a polarizable electrode body in accordance with claim 12, wherein:
said paper sheet is increased in density by mechanically applying pressure to opposite faces thereof.

16. A method for making a polarizable electrode body in accordance with claim 12, wherein:
on said sheet small holes of 0.5–3 mm are made, and a conductive layer is formed on one face of said polarizable electrode body and on inside walls bounding said holes.

17. The method of claim 12, wherein:
said fibrous binding medium is made of natural fibers.

18. An electric double-layer capacitor, comprising:
a polarizable electrode made by forming an electrically-conductive layer adhering on a paper sheet made of a mixture of at least activated carbon fiber and a fibrous binding medium, a counter electrode, and a separator disposed between said polarizable electrode and said counter electrode.

19. An electric double-layer capacitor in accordance with claim 18, wherein:
said counter electrode also comprises a paper sheet made of mixture of at least activated carbon fiber and fibrous binding medium as component element, said paper sheet having an electrically-conductive layer adhering thereon.

20. An electric double-layer capacitor in accordance with claim 18, wherein:
said binding medium comprises a mixture of at least one of a natural pulp and synthetic pulp.

21. An electric double-layer capacitor in accordance with claim 20 wherein:
at least one kind of Manila hemp and kraft pulp is used as said natural pulp.

22. An electric double-layer capacitor in accordance with claim 20, wherein:
at least one kind of polyethylene, polypropylene and acrylic synthetic pulp is used as said synthetic pulp.

23. An electric double-layer capacitor in accordance with claim 20, wherein:
said conductive layer is formed at least on one face of said paper sheet and on inside walls bounding small holes through said paper sheet; said paper sheet being constituted by no less than 40 wt% of activated carbon fiber and no less than 60 wt% of binding medium selected from the group consisting of natural pulp and synthetic pulp and has small holes of 0.5–3 mm diameter therethrough with 1–3 mm pitch, and said electrodes are disposed to oppose each other with said separator between them, and immersed in an electrolytic solution.

24. An electric double-layer capacitor in accordance with claim 23, wherein:
said activated carbon fiber constitutes 80 wt% of said paper sheet.

25. An electric double-layer capacitor in accordance with claim 23, wherein:
said small holes are of 1.5 mm diameter with 1.5 mm pitches.

26. An electric double-layer capacitor in accordance with claim 18, wherein:
a conductive substance is mixed into said paper sheet.

27. An electric double-layer capacitor in accordance with claim 26, wherein:
at least one of carbon fiber, graphite fiber, metal fiber, metal-coated carbon fiber, metal-coated resin fiber, carbon powder and graphite powder is mixed into said paper sheet as a conductivity improving agent.

28. An electric double-layer capacitor in accordance with claim 27, wherein:
said carbon fiber and said graphite fiber consist of at least one of polyacrylonitrile-type, pitch-type, phenol-type and rayon-type carbon and graphite fibers, respectively.

29. An electric double-layer capacitor in accordance with claim 18, wherein:
said paper sheet has a density of no less than 0.1 g/cm$^3$.

30. An electric double-layer capacitor in accordance with claim 18, wherein:
the proportion of binding medium in said paper sheet is no more than 60 wt%.

31. An electric double-layer capacitor in accordance with claim 18, wherein:
said paper sheet has a plurality of through-holes provided therethrough and has said conductive layer provided at least on one face of said paper sheet and on inside walls bounding said holes.

32. An electric double-layer capacitor in accordance with claim 18, wherein:
said activated carbon fibers for use in said paper sheet are ones selected from the group consisting of phenol-type, polyacrylonitrile-type, pitch-type and rayon-type activated carbon fibers.

33. An electric double-layer capacitor in accordance with claim 18, wherein:
activated carbon fiber obtained by carbonizing and activating phenol type novolak resin having specific surface area of no less than 1000 m$^2$/g is used for making said paper sheet.

34. An electric double-layer capacitor in accordance with claim 18, wherein:
activated carbon fiber of polyacrylonitrile-type having a specific surface area of no less than 500 m$^2$/g is used for making said paper sheet.

35. An electric double-layer capacitor in accordance with claim 18, wherein:
a non-polarizable electrode body is selected from the group consisting of lithium-containing Wood's metal, aluminum-lithium alloy and is used as said counter-electrode.

36. An electric double-layer capacitor in accordance with claim 18, wherein:
said conductive layer consists of sprayed metal formed by one of plasma spraying and arc spraying.

37. An electric double-layer capacitor in accordance with claim 18, wherein:
the length to diameter ratio of said activated carbon fiber is no less than 10.

38. The electric double-layer capacitor of claim 18, wherein:
said fibrous binding medium is made of natural fibers.

39. A sheet-type polarizable electrode body, comprising:
a non-woven sheet made of a matted mixture of:
(a) activated carbon fibers having a diameter of about 10 μm, a length of 1–5 mm, a specific surface area of 500–300 m$^2$/g, a pore diameter distribution of 20–40 Å, and a pore volume of 0.2–1.5 cc/g;
(b) a binding medium selected from the group consisting of fibrous Manila hemp, fibrous kraft pulp, polypropylene fiber, polyethylene fiber and acrylic fiber, consisting essentially of fibers ranging in length from 2 to 5 mm;
(c) a conductivity-improving agent selected from the group consisting of carbon fiber, stainless steel fiber 1–20 μm in length, nickel fiber 1–20 μm in length, stainless steel chips 1–10 μm in length, non-electrolytically metal-plated carbon fiber, graphite powder, carbon fiber, carbon black and metal-plated powdered resin;
the ratio of activated carbon fiber to binding medium in said sheet being in the range of 30:70 to 80:20;
said non-woven sheet having a conductive layer formed on a surface thereof, said layer being made of a metal selected from the group consisting of aluminum and nickel.

* * * * *

UNITED STATES PATENT AND TRADEMARK OFFICE
CERTIFICATE OF CORRECTION

PATENT NO. : 4,737,889

DATED : April 12, 1988

INVENTOR(S) : Nishino et al.

It is certified that error appears in the above-identified patent and that said Letters Patent is hereby corrected as shown below:

```
  On the Title Page Item [75] should read
-- [75]  Inventors:   Atsushi Nishino, Neyagawa;
                      Ichiro Tanahashi, Kadoma;
                      Akihiko Yoshida, Hirakata;
                      Yasuhiro Takeuchi, Hirakata,    --.
                      all of Japan
```

Signed and Sealed this

Eighth Day of November, 1988

Attest:

DONALD J. QUIGG

Attesting Officer

Commissioner of Patents and Trademarks